(12) United States Patent
Kling et al.

(10) Patent No.: US 12,084,270 B2
(45) Date of Patent: Sep. 10, 2024

(54) WASTE BIN AND METHOD OF SERVICING THE SAME

(71) Applicant: Essity Hygiene and Health Aktiebolag, Gothenburg (SE)

(72) Inventors: Robert Kling, Gothenburg (SE); Agne Svedberg, Borlange (SE)

(73) Assignee: ESSITY HYGIENE AND HEALTH AKTIEBOLAG, Gothenburg (SE)

(*) Notice: Subject to any disclaimer, the term of this patent is extended or adjusted under 35 U.S.C. 154(b) by 138 days.

(21) Appl. No.: 17/782,877

(22) PCT Filed: Dec. 6, 2019

(86) PCT No.: PCT/SE2019/051244
§ 371 (c)(1),
(2) Date: Jun. 6, 2022

(87) PCT Pub. No.: WO2021/112731
PCT Pub. Date: Jun. 10, 2021

(65) Prior Publication Data
US 2023/0002151 A1     Jan. 5, 2023

(51) Int. Cl.
*B65F 1/08*     (2006.01)
*B65F 1/00*     (2006.01)
(Continued)

(52) U.S. Cl.
CPC ............... *B65F 1/006* (2013.01); *B65F 1/08* (2013.01); *B65F 1/1426* (2013.01);
(Continued)

(58) Field of Classification Search
CPC .......... B65F 1/006; B65F 1/08; B65F 1/1426; B65F 1/1607
(Continued)

(56) References Cited

U.S. PATENT DOCUMENTS

| 1,021,872 | A |   | 4/1912 | Kingsbury |
| 3,342,368 | A | * | 9/1967 | Matry ............... B65F 1/1623 220/829 |

(Continued)

FOREIGN PATENT DOCUMENTS

| CH | 686080 A5 | 12/1995 |
| CN | 203111890 U | 8/2013 |

(Continued)

OTHER PUBLICATIONS

Canadian Application No. 3,160,149; Canadian Office Action dated Sep. 12, 2023; 6 pages.

(Continued)

*Primary Examiner* — J. Gregory Pickett
*Assistant Examiner* — Niki M Eloshway
(74) *Attorney, Agent, or Firm* — CANTOR COLBURN LLP (57) ABSTRACT

The present disclosure relates to a waste bin for waste paper products and other waste, the waste bin including a frame for supporting at least two, preferably exactly two, compartments; an upper compartment supported by the frame and configured to receive waste paper product, in particular, paper towels; and a lower compartment supported by the frame and configured to receive other types of waste; wherein the upper compartment is arranged above the lower compartment in a vertical direction of the waste bin, wherein the lower compartment comprises a liquid-impermeable bottom section and, preferably, liquid-impermeable sidewall sections, and wherein at least one of the upper and lower compartments is detachable from the frame, and wherein each of the upper compartment and the lower compartment is accessible for introducing waste material thereinto independently from the respective other compart- (Continued)

ment. The present disclosure further relates to a method of servicing a waste bin.

24 Claims, 4 Drawing Sheets

(51) Int. Cl.
*B65F 1/14* (2006.01)
*B65F 1/16* (2006.01)

(52) U.S. Cl.
CPC .... *B65F 1/1607* (2013.01); *B65F 2210/1443* (2013.01); *B65F 2210/18* (2013.01); *B65F 2210/184* (2013.01); *B65F 2240/1568* (2013.01); *B65F 2250/111* (2013.01); *B65F 2250/112* (2013.01); *B65F 2250/1143* (2013.01); *B65F 2250/1146* (2013.01)

(58) Field of Classification Search
USPC ........................................................ 220/480
See application file for complete search history.

(56) References Cited

U.S. PATENT DOCUMENTS

| | | | |
|---|---|---|---|
| 5,595,395 A | 1/1997 | Wilson | |
| 6,209,978 B1 | 4/2001 | Khan | |
| 7,874,247 B2 | 1/2011 | Wideaell | |
| 8,668,107 B2 * | 3/2014 | Decker | B65F 1/1436 221/98 |
| 10,377,567 B1 * | 8/2019 | Jones | B65F 1/1615 |
| 2012/0118784 A1 * | 5/2012 | Decker | B65F 1/1646 206/503 |
| 2015/0323366 A1 | 11/2015 | Kekalainen et al. | |
| 2016/0271909 A1 * | 9/2016 | Coupin | B32B 27/08 |
| 2017/0166396 A1 * | 6/2017 | Hughes | B65F 1/06 |
| 2017/0275094 A1 | 9/2017 | Peterson et al. | |
| 2017/0313503 A1 | 11/2017 | Busch | |
| 2019/0185261 A1 * | 6/2019 | Standke | B01D 29/13 |

FOREIGN PATENT DOCUMENTS

| | | | |
|---|---|---|---|
| CN | 103274145 A | 9/2013 | |
| CN | 203237647 U | 10/2013 | |
| CN | 104960816 A | 10/2015 | |
| CN | 206494388 U | 9/2017 | |
| CN | 208199481 U | 12/2018 | |
| CN | 110356736 A | * 10/2019 | ............... B65F 1/00 |
| CN | 110980048 A | * 4/2020 | ............... B65F 1/08 |
| DE | 142085 C | 2/1902 | |
| DE | 3828401 A1 | 2/1990 | |
| DE | 20318464 U1 | 3/2005 | |
| EP | 1405805 | 4/2004 | |
| EP | 3018077 A1 | 5/2016 | |
| FR | 2582924 A1 | 12/1986 | |
| FR | 2870526 A1 | 11/2005 | |
| GB | 610247 A | 10/1948 | |
| GB | 2383562 A | 7/2003 | |
| GB | 2548610 A | * 9/2017 | ............. B65F 1/006 |
| KR | 200358128 Y1 | 8/2004 | |
| KR | 200362239 Y1 | 9/2004 | |
| KR | 200393185 Y1 | 8/2005 | |
| KR | 20110101608 A | 9/2011 | |
| KR | 101658038 B1 | 9/2016 | |
| KR | 20190023653 A | 3/2019 | |
| WO | 2001038200 A1 | 5/2001 | |
| WO | 02064458 A2 | 8/2002 | |
| WO | 200409474 A1 | 1/2004 | |
| WO | 2012128649 A1 | 9/2012 | |
| WO | 2014150650 A1 | 9/2014 | |
| WO | 2014150661 A1 | 9/2014 | |

OTHER PUBLICATIONS

Chilean Application No. 202201484; Chilean Office Action dated Jun. 29, 2023; 18 pages.
Chinese Application No. 201980102777.X; Chinese Office Action with English translation dated Jul. 28, 2023; 30 pages.
International Search Report & Written Opinion for International Application No. PCT/SE2019/051244; International Filing Date: Dec. 6, 2019; Date of Mailing: Jul. 2, 2020; pp. 1-18.
Examination Report issued in Australian Application No. 2019477491, dated Jun. 17, 2023.
Extended European Search Reported issued in European Application No. 19954749.8; dated Nov. 9, 2023.
Second Office Action issued in Chinese Application No. 201980102777.X dated Dec. 26, 2023 with English Translation.

* cited by examiner

WASTE BIN AND METHOD OF SERVICING THE SAME

CROSS REFERENCE TO RELATED APPLICATIONS

This application is a National Stage application of PCT/SE2019/051244, filed Dec. 6, 2019, which is incorporated by reference in its entirety herein.

TECHNICAL FIELD

The present disclosure relates to a waste bin for waste paper products, in particular, paper towels, and other types of waste. The present disclosure further relates to a method of servicing a waste bin.

BACKGROUND ART

In many public facilities such as airports, railway stations, hotels, retail stores or the like, public washrooms or toilets are provided. In these washrooms or toilets, waste bins for collecting used paper towels are usually installed. A common method of servicing such waste bins resides in scheduling predetermined emptying time intervals. However, due to a wide variety regarding intensity of use, it may happen that service personnel arrive at a public washroom or toilet in order to empty a waste bin, yet, the respective waste bin is not completely full. Likewise, it may occur that a waste bin is already full well before expiration of the predetermined emptying time interval. In the latter case, customers may (due to lack of alternatives) already have disposed used paper towels elsewhere, e.g., on the floor of the public washroom or toilet.

The above-described cases may be associated, e.g., with an avoidable amount of workload (in case of emptying a waste bin too early), or with increased cleaning effort (in case of emptying a waste bin too late). On top of that, a public washroom or toiled having an overfilled waste bin (and maybe even used paper towels disposed on the floor of the washroom or toilet) may be associated with reduced comfort of use.

In some cases, a waste bin installed in a public washroom or toilette may appear to be completely filled due to relatively voluminous paper towels, however, compressing the content of the waste bin (instead of emptying it) may be sufficient in order to reenable the respective waste bin for use. Merely compressing a waste bin in order to reenable it for use may be advantageous in terms of effort and time (compared to immediately emptying it). It has, however, turned out that only a fill level of a waste bin is easily obtainable (i.e., due to an optical impression), but not an absolute number (or mass) of paper towels disposed therein. Moreover, as regards to the fill level, service personnel would still have to access a public washroom or toilet in order to obtain the respective information.

Another problem may arise from the fact that used paper towels are commonly (at least partially) moist or wet when being disposed into a waste bin. Yet, moist or wet items usually bear the risk of getting mouldy and/or rotten, and, consequently, starting to smell badly. It is, hence, desired to promote drying of paper towels even after they have been disposed into a waste bin. This may be achieved, e.g., if a waste bin comprises a basked made of metal wire such that air may permeate through layers of paper towels in order to (at least partially) dry them. If a waste bin comprises a basket made of metal wires, a liquid proof floor panel may be provided on the lower side of the basket in order to prevent liquid (which may leak from the basket due to wet items provided therein) from reaching the floor of the public washroom or toilet. However, waste bins utilizing a liquid proof floor panel may be associated with increased cost due to an increased number (and complexity) of components.

Challenges may also arise as soon as customers using public washrooms or toilets want to dispose other types of waste (other than used paper towels), such as packaging waste, empty plastic bottles, or the like into a waste bin. That is, if no additional waste bin for other types of waste is provided in a public washroom or toilet, the customer might dispose the items in question into a waste bin originally intended for used paper towels. It may then be challenging (and expensive) to separate the used paper towels from the other types of waste (e.g., in order to manufacture new paper towels from the material of the used paper towels). Therefore, the provision of at least one further waste bin (i.e., a waste bin for other types of waste) is envisaged more often in public washrooms or toilets. However, providing more than one waste bin may be associated with additional cost and increased installation space (in particular, a higher volume share and a higher areal share), compared to only one waste bin.

A waste bin has been proposed that relies upon two compartments, each of which is accessible from an opening formed in a top side portion of the waste bin. Through each of these openings, different types of waste may be disposed into the respective compartments of the waste bin, thereby promoting waste separation. Yet, if such a waste bin were to have the same installation space as a waste bin having only one compartment, each of the openings of the waste bin having two compartments would have a smaller cross-sectional area than an opening of a similar waste bin having only one compartment. Openings having small cross-sectional areas may, however, lead to limitations regarding the types of waste which are disposable into the respective compartments. That is, only items having smaller dimensions than a predetermined dimension may be disposable into the respective compartments, the predetermined dimension being smaller than a predetermined dimension associated with a waste bin having only one opening on a top side thereof. Further, a rather small opening of a waste bin may render it difficult to dispose used paper towels therethrough. In particular, it might in some cases be necessary to actively push a used paper towel through such a rather small opening. The risk then increases that a customer accidentally touches portions of the waste bin, which should be avoided at least for hygienic reasons.

SUMMARY

It is an objective of the present disclosure to overcome at least one of the above-mentioned disadvantages in a simple but nevertheless effective way.

A waste bin in accordance with the present disclosure is defined in claim 1. Another waste bin in accordance with the present disclosure is defined in claim 21. Another waste bin in accordance with the present disclosure is defined in claim 22. A method of servicing a waste bin in accordance with the present disclosure is defined in claim 24. Dependent claims relate to preferred embodiments.

According to the present disclosure, a waste bin for waste paper products and other types of waste is provided. The waste bin comprises: a frame for supporting at least two, preferably exactly two, compartments; an upper compartment supported by the frame and configured to receive waste paper product, in particular, paper towels; and a lower compartment supported by the frame and configured to receive other types of waste. The upper compartment is arranged above the lower compartment in a vertical direction of the waste bin. In other words, an imaginary line extending from the upper compartment to the lower compartment may be defined to be the vertical direction. Preferably, an imaginary line extending from a center of the upper compartment to a center of the lower compartment is defined to be the vertical direction. The respective centers may be mass- or volume centroids. In use, the vertical direction may be the gravity direction. The lower compartment comprises a liquid-impermeable bottom section and, preferably, liquid-impermeable side-wall sections. An intermediate section (or a plurality of intermediate sections) may be provided in-between the bottom section and (at least one of) the side-wall sections of the lower compartment, said intermediate section(s) preferably also being liquid-impermeable. At least one of the upper compartment and the lower compartment is detachable from the frame. Preferably, each of the lower compartment and the upper compartment is independently detachable from the frame.

The term "detachable" relates to a configuration allowing a fixation between a respective compartment to be released such that the respective compartment may be spatially separated from the frame. Preferably, the term detachable also includes cases allowing the fixation to be reestablished. The waste bin may, for example, be configured such that the upper compartment, the lower compartment or both compartments may be detached and re-attached independently from each other any number of times.

The above-described configuration (in particular, the feature wherein the upper compartment is arranged vertically above the lower compartment) allows providing a waste bin having two compartments (e.g., for promoting separation of different types of waste) while utilizing the installation space (in particular, the installation area) of a waste bin having only one compartment. The above-described waste bin, hence, allows installing a waste bin having two compartments also in small public washrooms or toilets. Put differently, the above-described configuration may be considered to promote environmental sustainability, as it allows increasing the share of washrooms or toilets being equipped with a waste bin enabled for waste separation. Moreover, the (reduced) installation space of the above-described waste bin may be associated with reduced cost as it allows public washrooms or toilets to be designed smaller.

On top of that, the configuration of the above-described waste bin may be considered to promote simplicity (and ease) of an emptying operation (compared to waste bins having more than one compartment). That is, due to the fact that at least one of the compartments of the above-described waste is independently detachable, the absolute weight that has to be lifted (e.g., by service personnel) during an emptying operation may be reduced. Put differently, the independent detachability of the at least one compartment may be considered to enable a sequential (and/or serial) emptying operation.

The liquid impermeability of the (above-mentioned components of the) lower compartment may be considered to advantageously promote cleanliness of the public washroom or toilet in which the respective waste bin is installed. That is, a liquid impermeable lower compartment may prevent liquid (which may leak from the upper compartment, e.g., due to wet paper towels provided therein) from reaching the floor of the public washroom or toilet. The lower compartment may, hence, be considered to fulfil the additional purpose (besides the purpose of receiving other types of waste) of collecting liquid potentially leaking from the upper compartment. The (vertical) arrangement of the upper compartment and the lower compartment as well as the liquid impermeability of the lower compartment, hence, synergistically promote cost saving effects.

The waste bin in accordance with the present disclosure is configured such that each of the upper compartment and the lower compartment is accessible for introducing waste material thereinto independently from the respective other compartment.

In this context, the term "independently" may be understood such that one does not have to utilize (e.g., open, detach, or push aside) a first compartment in order to access a second compartment for introducing waste material thereinto. Moreover, the term "independently" may be considered to exclude cases in which waste material inevitably has to pass through a first compartment in order to arrive at a second compartment (e.g., if the first compartment serves as a "sieve" or "filter").

Yet, it is to be noted that the upper compartment serving as sieve or filter may be a desirable feature, e.g., if a mesh structure is provided in the first compartment (such as the mesh structure described further below). That is, the mesh structure may, e.g., have a mesh size configured such that used paper towels stay inside the upper compartment (i.e., do not fall through openings of the mesh), whereas other types of waste (e.g., other types of waste accidentally disposed into the upper compartment, such as cigarette ends or the like) fall through openings of the mesh. For this purpose, the mesh may only have openings, the maximum extension (in any direction) of which is equal to or lower than 10 cm. Preferably, the maximum extension (in any direction) of each opening of the mesh is equal to or lower than 5 cm. Most preferably the maximum extension (in any direction) of each opening of the mesh is equal to or lower than 2 cm. It is further preferred that the cross-sectional area of each openings of the mesh is equal to or greater than 100 $cm^2$, equal to or greater than 25 $cm^2$, or equal to or greater than 4 $cm^2$. Alternatively, one or more of the previously defined conditions as regards areas and/or maximum extensions of the openings may apply only to openings of a mesh (or a portion of the mesh) provided in a lower end portion of the upper compartment.

According to some aspects, at last one of, preferably both of, the upper compartment and the lower compartment are detachable from the frame independently from each other.

Detaching a (first) compartment independently means that no other (i.e., second) compartment has to be detached (or utilized otherwise) during the process of detaching the first compartment. An example of a first compartment not being independently detachable would, hence, include that one would firstly have to detach (or, e.g., open) a second compartment in order to subsequently detach the first compartment.

The above-described waste bin may have a plurality of lower compartments. The plurality of lower compartments may be provided below the upper compartment, and arranged adjacent to each other in a horizontal direction, the horizontal direction intersecting the vertical direction. Preferably, the horizontal direction is substantially perpendicular to the vertical direction. The frame of the above-mentioned waste bin may have a receiving portion configured to hold one, as well as several lower compartments, such that a configuration of the waste bin may be easily and quickly varied in accordance with specific demands.

A third compartment (or a plurality of third compartments) may be provided below the lower compartment or below the lower compartments. A waste bin having multiple compartments as described above may advantageously promote highly differentiated waste separation.

The above-described waste bin may further comprise a wall mounting interface configured for attaching the waste bin to a wall, in particular, a wall of a public washroom or toilet. A waste bin having a wall mounting interface may advantageously allow installing the respective waste bin such that the space below the waste bin is accessible (e.g., in order to facilitate cleaning of the space below the waste bin, or in order to place other items such as a storage board, a shoe cleaning machine, or the like under the waste bin).

Alternatively or additionally, the above-described waste bin may comprise a pedestal configured to enable floor standing operation of the waste bin. It is noted that floor standing operation is a rather simple mode of operation (as, e.g., no holes need to be drilled into walls of a public washroom or toilet). Providing a pedestal may, hence, be considered to facilitate quick and easy use of the waste bin. Moreover, if both a pedestal and a wall mounting interface are provided, the respective waste bin may be associated with increased flexibility in use.

In the above-described waste bin, at least a part of the upper compartment may be made of an air-permeable and/or liquid-permeable material. Alternatively or additionally, at least a part of the upper compartment may have an air-permeable and/or liquid-permeable structure. Examples for air-permeable and/or liquid permeable materials comprise membranes such as EPTFE (expanded polytetrafluoroethylene, which is also known as GoreTex), PES (polyethersulfone), Zeolite (Aluminosilicate) or the like. Examples of an air-permeable and/or liquid permeable structure comprise a structure having a plurality of openings, or a structure having a plurality of channels, in order to enable communication between the upper compartment and the outside air, e.g., through side walls of the upper compartment. The upper compartment of the waste bin may comprise at least five faces (e.g., a front face, a left face, a right face, a back face and a bottom face). A plurality of openings may be provided, e.g., in exactly one of the previously mentioned faces, in exactly two of the previously mentioned faces, in exactly three of the previously mentioned faces, in exactly four of the previously mentioned faces, or in exactly five of the previously mentioned faces. Preferably, a plurality of openings are provided in each of the faces of the upper compartment.

According to an aspect, the upper compartment comprises a plurality of openings in all faces thereof except in a face of the upper compartment facing the frame.

An upper compartment having the above-described configuration may be considered to promote drying of moist or wet paper towels disposed therein. Therefore, a risk of the paper towels getting mouldy and/or rotten may be reduced. Likewise, the generation of bad smells arising from mouldy paper towels may be prevented. It is noted that an upper compartment having the above-described configuration may be considered particularly advantageous in conjunction with the (liquid impermeable) lower compartment, as this combination allows using the waste bin (in particular, the upper compartment) without a garbage bag.

The upper compartment of the waste bin in accordance with the present disclosure may be made of or otherwise comprise a mesh structure. Preferably, the mesh structure is made of (or comprises) a plastic material or a metal, such as a steel-based alloy or an aluminum-based alloy. While both the plastic and the metal type may be associated with low cost production, the plastic type may further be advantageous as regards to weight of the upper compartment. Specifically, an upper compartment being made of (or comprising) a plastic material may allow an operator (e.g., service personnel) to easily lift the upper compartment, for example during an emptying procedure.

If plastic material is utilized in the upper compartment, the plastic material may comprise or consist of a Polypropylene-, and/or Polyethylene-compound, preferably a reinforced Polypropylene- and/or Polyethylene-compound such as a glass-fibre-reinforced Polypropylene- and/or Polyethylene-compound. Preferably, the Polypropylene- and/or Polyethylene-compounds comprise recycled material. Polypropylene-, and Polyethylene-compounds (in particular, such compounds comprising recycled material) may be associated with cost advantages and environmental sustainability. Reinforcing said compounds with fibers, such as glass fibers, may lead to increased mechanical properties, in particular, to increased tensile/flexural strength, increased tensile/flexural moduli, and optimized impact strength.

In a waste bin in accordance with the present disclosure, the upper compartment may comprise a deposit opening for depositing waste paper products into the upper compartment, the deposit opening being provided in an upper end portion of the upper compartment. A vertical projection of an area of the deposit opening may occupy at least 50%, 60%, 70%, 80% or 90% of a maximum cross-sectional area of the waste bin in a plane perpendicular to the vertical direction.

An upper compartment having a large deposit opening on a top side thereof (i.e., a deposit opening as defined above) may be associated with benefits as regards to comfort in use and hygiene. As discussed in the introductory portion of the present application, deposit openings having small cross-sectional areas may lead to limitations regarding the types of waste which are disposable into the respective compartments. That is, only items having smaller dimensions than a predetermined dimension may be disposable into the respective compartments, the predetermined dimension being smaller than a predetermined dimension associated with a waste bin having only one opening on a top side thereof. Also, a rather small opening of a compartment may render it particularly difficult to dispose used paper towels therethrough. Specifically, it might in some cases be necessary to actively push a used paper towel through such a rather small opening. The risk would then increase that a customer accidentally touches portions of the waste bin, which should be avoided at least for hygienic reasons.

It is noted that the above-defined size of an opening may only be achieved due to the fact that no other compartment is provided (horizontally) adjacent to the upper compartment. Put differently, the previously described features may be considered to synergistically interact with the vertical arrangement of the upper and the lower compartment.

In the waste bin in accordance with the present disclosure, the deposit opening (of the upper compartment) preferably lies within a horizontally-oriented plane (i.e., a plane being perpendicular to the vertical direction). However, the deposit opening may alternatively be provided (substantially) in a plane which is inclined with respect to the vertical direction at an angle between 30° to 90°, at an angle between 60° to 90°, or at an angle between 80° to 90°. The above-defined orientations may be considered advantageous as they promote ease of depositing waste items therethrough. That is, as long as the deposit opening is not exclusively provided in a vertically oriented plane, gravity may assist in disposing used paper towels through the deposit opening.

In the waste bin in accordance with the present disclosure, also the lower compartment may comprise a deposit opening provided in an upper end portion thereof. The deposit opening of the lower compartment may lie in a plane which is inclined with respect to the vertical direction at an angle between 30° to 90°, preferably at an angle between 60° to 90°, and more preferably at an angle between 80° to 90°.

Preferably, the deposit opening of the lower compartment is accessible for incorporating waste material thereinto least from, preferably exclusively from, a front side, a first lateral side and/or a second lateral side of the waste bin. Preferably, the lower compartment comprises exactly one deposit opening. The front side and the lateral sides are sides of the waste bin provided substantially parallel to the vertical direction. If the waste bin comprises a wall mounting interface, the front side of the waste bin is preferably a side provided on a side opposite the the wall mounting interface. Further, if the waste bin comprises a wall mounting interface, the lateral sides of the waste bin are preferably sides provided adjacent to the wall mounting interface. Measures that may enable (or promote) a lower compartment to be accessible for incorporating waste material thereinto are described hereinafter.

A measure that may enable (or promote) a lower compartment to be accessible for incorporating waste material thereinto may reside in that a lower portion of the upper compartment is tapered and/or rounded such that a cross-sectional area of the upper compartment in a plane perpendicular to the vertical direction decreases in the direction from the upper compartment towards the lower compartment.

Another measure that may enable (or promote) a lower compartment to be accessible for incorporating waste material thereinto may reside in that the upper compartment and the lower compartment are spaced from each other along the vertical direction. In that case, a lowermost portion of the upper compartment may, provided, e.g., at least 5 cm, 10 cm, 15 cm, 20 cm, 25 cm or 30 cm above an uppermost portion of the lower compartment in the vertical direction of the waste bin.

Yet another measure that may enable (or promote) a lower compartment to be accessible for incorporating waste material thereinto may reside in that the upper compartment comprises a deposit opening provided in an upper end portion thereof, wherein the lower compartment comprises a deposit opening provided in an upper end portion thereof, wherein a vertical projection of an area of the deposit opening of the lower compartment extends at least partially beyond a vertical projection of a bottom portion of the upper compartment in one or more directions perpendicular to the vertical direction of the waste bin.

Yet another measure that may enable (or promote) a lower compartment to be accessible for incorporating waste material thereinto may reside in that the lower compartment comprises a deposit opening provided in an upper end portion thereof, wherein the deposit opening (at least partially) extends in the vertical direction.

In the waste bin in accordance with the present disclosure, a lower portion of the lower compartment may be tapered and/or rounded. On one hand, this may be associated with preventing dirt from accumulating in inner corners of the lower compartment (e.g., due to the absence of narrow corners). On the other hand, tapered and/or rounded lower portions of the lower compartment may enable a configuration in which a deposit opening of the lower compartment (provided in an upper portion thereof) protrudes to a side of the waste bin (in a horizontal direction) with respect to a bottom portion of the lower compartment. The above-described configuration may, hence, also be considered a measure that may enable (or promote) a lower compartment to be accessible for incorporating waste material thereinto.

The above-described measures may be combined in any permutations thereof in so far not structurally or functionally interfering with each other.

In the waste bin in accordance with the present disclosure, the lower compartment may be provided with a disposable insert. The disposable insert preferably comprises (or is made of) an absorbent material. In particular, the disposable insert may be made of or comprise compressed fibers, such as wood fibers, or other types of cellulose-based material (including recycled cellulose-based material). Providing a disposable insert as described above may be considered to advantageously promote simplicity (and duration) of an emptying operation of the lower compartment. That is, in order to empty a lower compartment having a respective insert, an operator (e.g., service personnel) would only have to remove the insert comprising the waste material from the lower compartment, and dispose the insert comprising the waste material (e.g., into a larger waste collector). In contrast, without such an insert, an operator would have to detach the lower compartment from the frame of the waste bin, empty the lower compartment (e.g., into a larger waste collector), and reattach the lower compartment to the frame. Also, proving said insert may be associated with advantages as regards to cleanliness of the lower compartment (i.e., no waste material may get in contact with inner surfaces of the lower compartment).

The waste bin in accordance with the present disclosure may further comprise a cover lid pivotably mounted to the frame in an upper end portion thereof and configured to adopt a plurality of positions including a use-position. The cover lid may comprise a lid opening which is, in the use-position, provided so as to align with a deposit opening of the upper compartment such that an outer circumferential edge of the deposit opening of the upper compartment is covered by the cover lid. Providing a cover lid as described above may be advantageous as it may allow further components to be hidden thereunder (such as a sensor, an attachment mechanism for attaching the upper compartment to the frame, an operating manual of the waste bin, or the like).

In the above-described waste bin, the use-position may be a position in which the upper compartment is fixed to the frame by the cover lid. Further, the cover lid may be configured to adopt a release position enabling the upper compartment to be detached from the waste bin. The use-position may be a position in which a plane in which the lid opening is provided is substantially parallel to a plane in which the deposit opening of the upper compartment is provided. The release position may be a position in which a plane in which the lid opening is provided is inclined with respect to a plane in which the deposit opening of the upper compartment is provided. In the latter case, the angle of inclination may, e.g., be between 30° and 120°, between 50° and 100°, between 60° and 100° or between 80° and 100°, the boundary values being respectively included.

Another waste bin in accordance with the present disclosure is a waste bin for waste paper products and/or other types of waste. Preferably, the other waste bin in accordance with the present disclosure is one of the above-described waste bins. The other waste bin in accordance with the present disclosure comprises: a frame, the frame preferably comprising a wall mounting interface configured for attaching the waste bin to a wall, in particular, a wall of a public washroom; a compartment configured to receive waste paper products and/or other types of waste; a holder part pivotably attached to the frame, so as to be pivotable relative to the frame around a pivot axis, and configured to support the compartment at at least two, preferably exactly two, contact portions thereof. The pivot axis is arranged such that a gravity force of the compartment acting on the holder part is at least partially converted into a force having a component in a horizontal direction. The horizontal direction is a direction perpendicular to a gravity direction. The other waste bin in accordance with the present disclosure further comprises a sensor configured to measure at least a part of the component of the force in the horizontal direction. The sensor may, hence, be considered to be a weight sensor.

As described in the introductory portion of the present application, it may be difficult to obtain a weight of used paper towels disposed in a compartment of a waste bin (e.g., purely from an optical impression). Yet, in some cases, obtaining weight-related information may be crucial in order to decide whether a waste bin has to be emptied (e.g., if mechanical overload/breakage of components of the waste bin were to be prevented). The above-described configuration, hence, provides a simple, yet cost-efficient way of obtaining the desired weight information.

The other waste bin in accordance with the present disclosure may further comprise output means for outputting information obtained by the sensor. The output means may, e.g., be provided spatially close to the waste bin. Alternatively or additionally, the output means may be a remotely operable device, such as a cellphone or a tablet. For the latter purpose, the waste bin may further comprise a network device configured to (wirelessly) provide information obtained by the sensor to the remotely operable device. Utilizing a remotely operable device as an output means may be considered particularly advantageous as it may allow an operator (e.g., service personnel) to permanently monitor a waste bin (or a plurality of waste bins installed in different washrooms or toilets, respectively) without the necessity of being physically present.

Yet another waste bin in accordance with the present disclosure is a waste bin for waste paper products and/or other types of waste. Preferably, this waste bin is any one of the above-described waste bins. This waste bin comprises: a compartment configured to receive waste paper products and/or other types of waste; a weight sensor configured to measure a total weight of the compartment or a weight of waste introduced into the compartment; and a level sensor configured to measure a fill level of the compartment. The level sensor may comprise a time of flight sensor, preferably utilizing infrared light, a radar sensor, a capacitive sensor, an ultrasonic sensor, a photoelectric barrier, and/or an array of photoelectric barriers.

Preferably, the above-described waste bin further comprises first output means for outputting information obtained by the weight sensor, and second output means for outputting information obtained by the level sensor. Each of the output means may, e.g., be provided spatially close to the waste bin, respectively. Alternatively or additionally, each of the output means may be a remotely operable device, such as a cellphone or a tablet. Moreover, the above-described waste bin may further comprise a network device configured to (wirelessly) provide information obtained by the weight sensor and information obtained by the level sensor to the remotely operable device. The first output means and the second output means may be different output means, or they may be the same output means.

The above-described waste bin may be considered advantageous as it may allow an operator to decide whether emptying or compressing is necessary. Another advantage of the above-described waste bin may arise if a remotely operable device is used as the output means. In this case, the operator may not be physically present in a washroom or toilet in order to obtain information whether a waste bin requires a type of servicing (such as compressing or emptying) or not.

Analogous advantages and effects may be associated with a method in accordance with the present disclosure, which is a method of servicing any one of the above-described waste bins. In this method, the waste bin further is further configured to output a value W measured by the weight sensor and a value L measured by the level sensor. The method comprises the steps of (a) comparing the value W to a predetermined weight value PW;
(b) comparing the value L to a predetermined fill level value PL;
(c) if L≥PL and W<PW, compressing the waste in the compartment;
(d) if L≥PL and W≥PW, emptying the compartment.

BRIEF DESCRIPTION OF THE DRAWINGS

Additional advantages and features of the present disclosure, that can be realized on their own or in combination with one or several features discussed above, insofar as the features do not interfere with each other, will become apparent from the following description of working examples and/or optional or aspects and/or embodiments. The description is provided with reference to the accompanying drawings, in which.

DETAILED DESCRIPTION OF EMBODIMENTS

Embodiments of devices in accordance with the present disclosure will hereinafter be explained in detail, by way of non-limiting example only, and with reference to the accompanying drawings. Like reference signs appearing in different figures denote identical, corresponding, or functionally similar elements, unless indicated otherwise.

Figure 1:
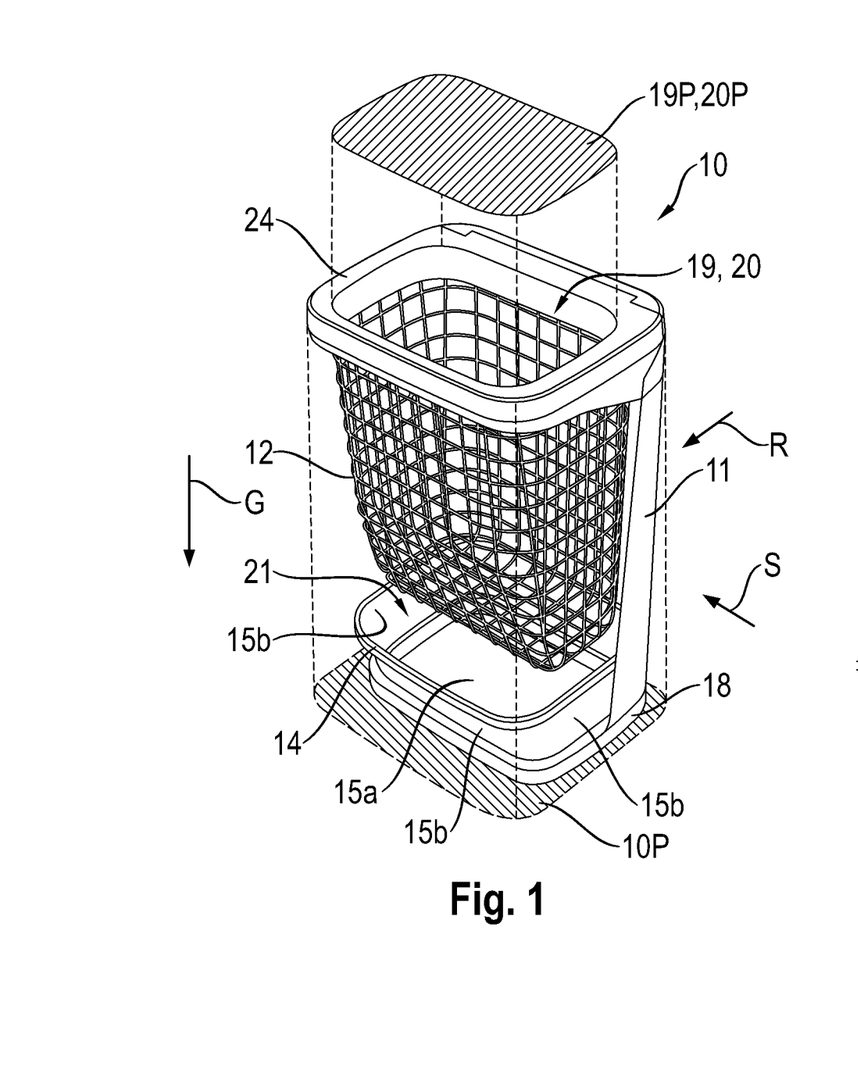
FIG. 1 is a first perspective view of an embodiment of a waste bin in accordance with the present disclosure.
Figure 2:
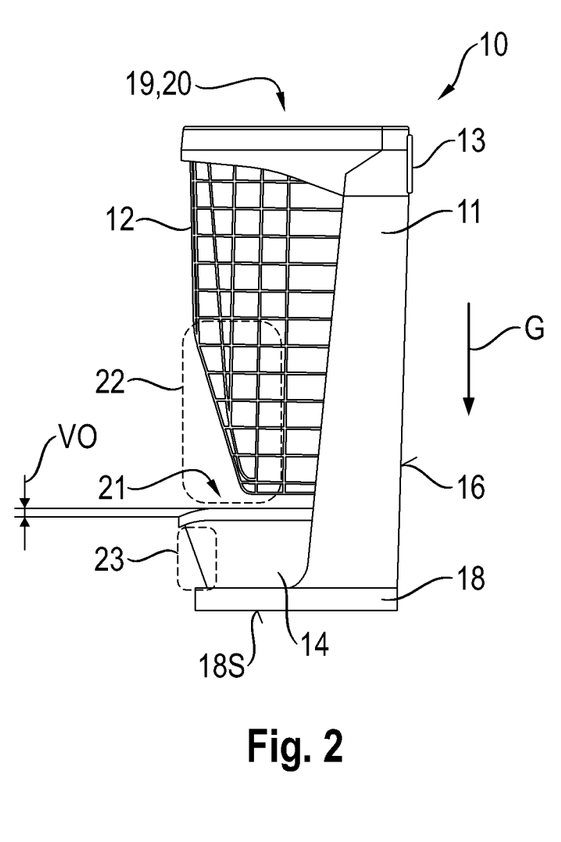
FIG. 2 is a side view of the waste bin depicted in FIG. 1.
Figure 3:
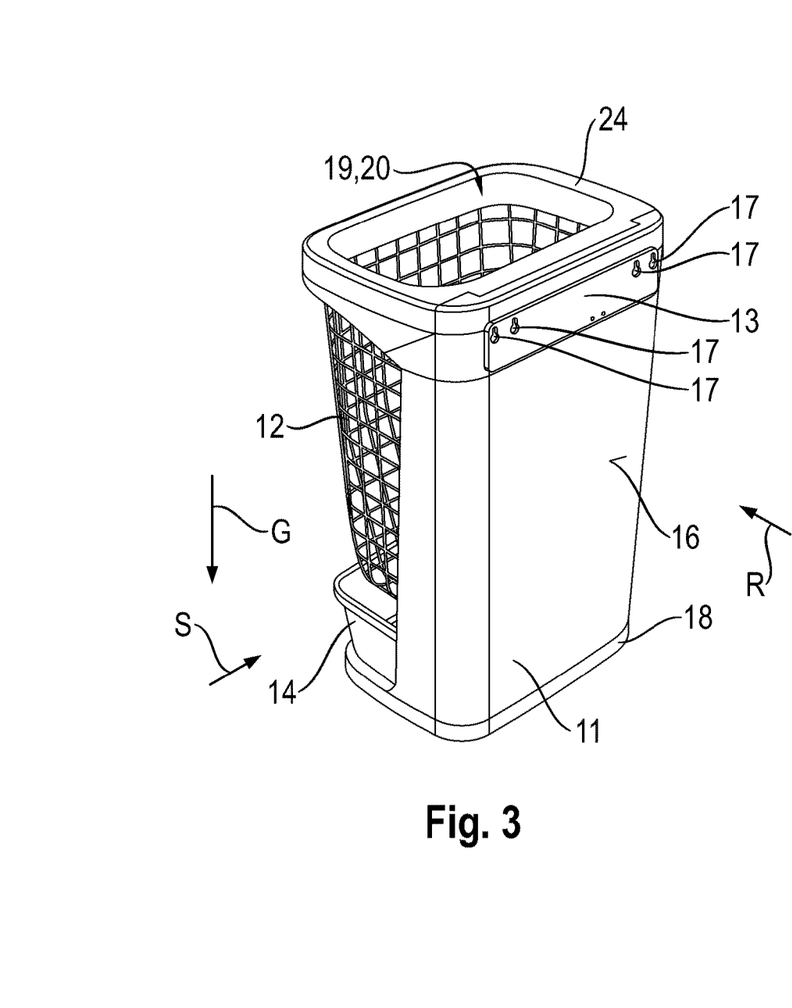
FIG. 3 is a second perspective view of the waste bin depicted in FIGS. 1 and 2.

An embodiment of a waste bin 10 in accordance with the present disclosure is depicted in FIG. 1, FIG. 2 and FIG. 3. FIG. 1 is a first perspective view the waste bin 10, FIG. 2 is a side view of the waste bin 10, and FIG. 3 is a second perspective view of the waste bin 10. In FIGS. 1 and 3, the orientation of the side view of FIG. 2 is indicated by reference sign S. Reference sign R in FIGS. 1, 3 and 6 indicates a rear side of the waste bin 10. Throughout FIGS. 1 to 9, reference numeral G indicates a gravity direction.

The waste bin 10 depicted in FIGS. 1, 2 and 3 is a waste bin for waste paper products and other types of waste. The waste bin 10 comprises: a frame 11, an upper compartment 12 and a lower compartment 14. The frame 11 is configured to support the upper compartment 12 and the lower compartment 14. The upper compartment 12 is configured to receive waste paper product such as paper towels. The lower compartment 14 is supported by the frame 11 and configured to receive other types of waste. The upper compartment 12 is arranged above the lower compartment in a vertical direction of the waste bin 10. Throughout FIGS. 1 to 9, the vertical direction is the gravity direction G. The lower compartment 14 comprises a liquid-impermeable bottom section 15a and liquid-impermeable side-wall sections 15b. Each of the upper compartment 12 and the lower compartment 14 is independently detachable from the frame 11. The waste bin 10 is configured such that each of the upper compartment 12 and the lower compartment 14 is accessible for introducing waste material thereinto independently from the respective other compartment. The waste bin 10 comprises, provided on a back face 16 thereof, a wall mounting interface 13. The wall mounting interface 13 is configured for attaching the waste bin 10 to a wall, in particular, a wall of a public washroom. The wall mounting interface 13 comprises a plurality of wall-mounting means 17 such as key-hole shaped openings configured to accommodate fastening means such as screws or the like provided in a respective wall. The waste bin 10 further comprises a pedestal 18 configured to enable floor standing operation of the waste bin 10. The pedestal 18 comprises, on a lower end portion thereof, a floor standing surface 18S.

The upper compartment 12 of the waste bin 10 comprises a deposit opening 19 for depositing waste paper products therethrough, into the upper compartment 12. The deposit opening 19 is provided in an upper end portion of the upper compartment 12. A vertical projection 19P of an area of the deposit opening 19 of the upper compartment 12 occupies approximately 70% of a maximum cross-sectional area 10P of the waste bin 10 in a plane perpendicular to the vertical direction. The deposit opening 19 of the upper compartment 12 lies in a plane which is inclined with respect to the vertical direction at approximately 90°.

The lower compartment 14 comprises a deposit opening 21. The deposit opening 21 of the lower compartment 14 is accessible for incorporating waste material thereinto from a front side, a first lateral side and a second lateral side of the waste bin 10. The front side of the waste bin 10 is a side provided on a side of the waste bin 10 opposite the wall mounting interface 13. The lateral sides of the waste bin 10 are sides provided adjacent to the wall mounting interface 13.

The deposit opening 21 of the lower compartment 14 is not planar, but follows a curve. That is, a first portion of the deposit opening 21 (i.e., a portion provided adjacent to a back face 16 of the frame 11) of the lower compartment 14 lies within a substantially flat plane which is inclined with respect to the vertical surface at approximately 90°, while another portion (i.e., a portion provided opposite to the back face 16 of the frame 11) of the deposit opening 21 of the lower compartment 14 lies within a plane which is inclined with respect to the vertical direction at approximately 80°. Therefore, a gap VO is provided in the lower compartment 14, the gap VO extending in the vertical direction. In other words, the deposit opening 21 of the lower compartment 14 extends, at least partially, in the vertical direction.

The waste bin 10 further comprises a cover lid 24 pivotably mounted to the frame 11 in an upper end portion thereof. The cover lid 24 is configured to adopt a plurality of positions including a use-position. FIGS. 1, 2 and 3 depict the cover lid 24 being in said use-position. The cover lid 24 comprises a lid opening 20 which is, in the use-position, provided so as to align with a deposit opening of the upper compartment such that an outer peripheral edge of the deposit opening 19 of the upper compartment 12 is covered by the cover lid 24. In FIG. 1, a vertical projection 20P of an area of the lid opening 20 is substantially congruent with the vertical projection 19P of an area of the deposit opening 19 of the upper compartment 12.

A lower portion 22 of the upper compartment 12 is tapered such that a cross-sectional area of the upper compartment 12 in a plane perpendicular to the vertical direction decreases in the direction from the upper compartment 12 towards the lower compartment 14.

In the waste bin 10 of FIGS. 1, 2, and 3, a vertical projection 21P of an area of the deposit opening 21 of the lower compartment 14 extends partially beyond a vertical projection of a bottom portion of the deposit opening of the upper compartment 12 in a direction perpendicular to the vertical direction of the waste bin 10. In other words, the deposit opening 21 (i.e., a vertical projection 21P of an area of the deposit opening 21) of the lower compartment 14 protrudes to a front side of the waste bin 10 (in a horizontal direction) with respect to a bottom portion of the lower compartment 14. Moreover, in the waste bin 10 of FIGS. 1, 2, and 3, a lower portion 23 of the lower compartment is tapered such that a cross-sectional area of the lower compartment 14 in a plane perpendicular to the vertical direction increases in the direction from the lower compartment 14 towards the upper compartment 12.

Figure 4:
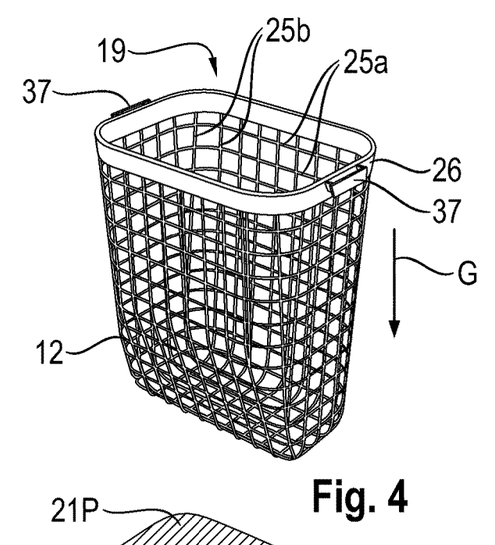
FIG. 4 is a perspective view of an upper compartment of the waste bin of FIGS. 1, 2 and 3.

FIG. 4 depicts a perspective view of an upper compartment 12 of the waste bin 10 of FIGS. 1, 2 and 3. The upper compartment 12 comprises, in five faces thereof, a plurality of openings. The five faces include a front side, a back side, a first lateral side, a second lateral side, and a bottom side. A tapered portion of the upper compartment may be attributed to be part of the front side. In the upper compartment 12 depicted in FIG. 4, the openings are formed by a mesh structure. The mesh structure may, e.g., be obtained by joining a plurality of (partially bent) first wires 25a, and a plurality of (partially bent) second wires 25b. The first wires 25a and the second wires 25b may be provided substantially perpendicular to each other. The wires may be metal wires, some of which are welded to respective other ones. Alternatively or additionally, the wires may be plastic and/or aluminum wires integrally formed and/or manufactured by virtue of an injection molding process.

The upper compartment 12 depicted in FIG. 4 comprises an upper collar 26. The upper collar 26 is provided with attachment means 37 configured to be brought into contact with, or to be attached to the frame 11 of the waste bin 10. The upper compartment 12 of FIG. 4 comprises exactly two attachment means 37. According to a variant, the attachment means 37 may further be configured to simultaneously serve as handles in order to promote ease of detaching, carrying, and/or emptying the upper compartment 12 (by an operator, such as service personnel).

Figure 5:
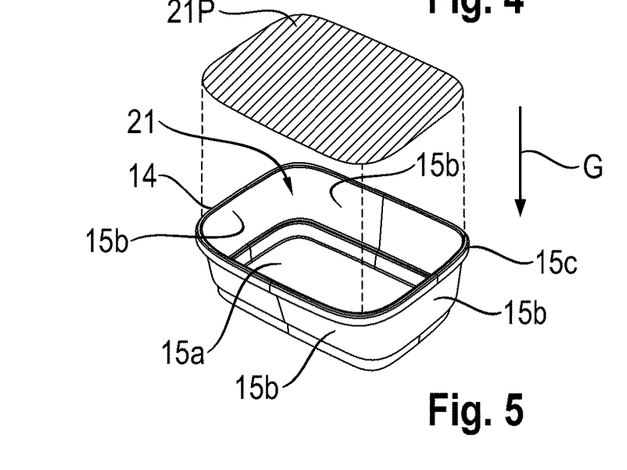
FIG. 5 is a perspective view of a lower compartment of the waste bin of FIGS. 1, 2 and 3.

FIG. 5 depicts a perspective view of a lower compartment 14 of the waste bin 10 of FIGS. 1, 2 and 3. As previously described, the lower compartment 14 comprises a liquid-impermeable bottom section 15a and liquid-impermeable side-wall sections 15b. The lower compartment 14 further comprises, in an upper end portion thereof, a collar 15c. The collar 15c of the lower compartment 14 may promote mechanical robustness of the lower compartment 14 and may further promote ease of detaching (and/or removing) of the lower compartment 14 from the frame 11. FIG. 5 further illustrates a vertical projection 21P of the deposit opening 21 of the lower compartment 14.

Figure 6:
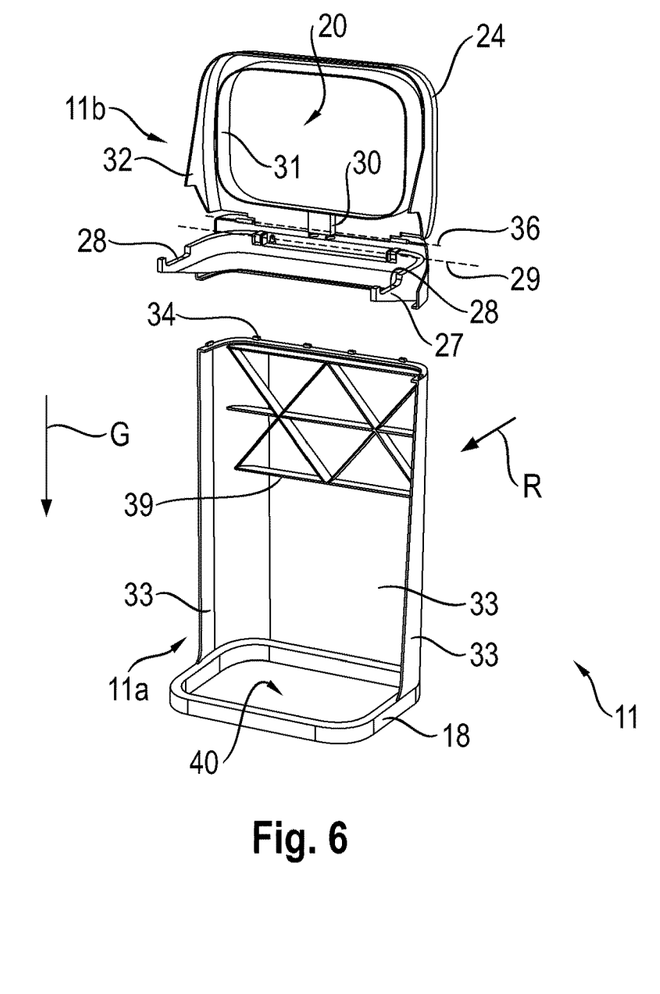
FIG. 6 is a partially exploded perspective view of the frame of the waste bin of FIGS. 1, 2 and 3.

FIG. 6. depicts a partially exploded perspective view of the frame 11 of the waste bin 10 of FIGS. 1, 2 and 3. The frame 11 comprises a lower frame assembly 11a and an upper frame assembly 11b. The lower frame assembly 11a comprises the pedestal 18, which is configured so as to form a receiving opening 40 for accommodating and/or supporting the lower compartment 14. The lower frame assembly 11a further comprises a substantially U-shaped wall 33. The lower frame assembly 11a further comprises, in an upper portion thereof, attachment means 34 configured to be attached to (centering pieces of) the upper frame assembly 11b. The lower frame assembly 11a of FIG. 6 further comprises casting ribs 39 which may be present in order to promote robustness of the lower frame assembly 11a. In FIG. 6, the upper frame assembly 11b is depicted in a state in which the cover lid 24 adopts a release position. Unlike in the use-position depicted, e.g., in FIGS. 1, 2, and 3, the opening 20 of the cover lid 24 in the release position is not parallel to the deposit opening 19 of the upper compartment 12. Rather, in the release position, the opening 20 (i.e., a plane comprising the opening 20) of the cover lid 24 includes an angle with the deposit opening 19 (i.e., with a plane comprising the deposit opening 19) of the upper compartment 12.

The upper frame assembly 11b depicted in FIG. 6 further comprises a holder part 27 configured to hold the upper compartment 12. The holder part 27 has attachment portions 28 configured to accommodate (and or to be joined with) the attachment means 37 of the upper compartment 12.

The cover lid 24 of the frame 11 is pivotable about a lid axis 36 so as to adapt the use-position and the release-position. The cover lid 24 further comprises an outer lid collar 32 and an inner lid collar 31 configured to hide the collar 26 of the upper compartment 12, the attachment means 37 of the upper compartment 12, and/or the holder part 27 of the frame 11, when in the use-position. Optionally, the cover lid 24 (and/or the waste bin 10) may be provided with a level sensor 30 configured to measure a fill level of the upper compartment 12. Further, optionally, the holder part 27 may also be pivotably attached to the frame 11. In particular, the holder part 27, may be pivotable with respect to the frame about a pivot axis 29, which will be described hereinafter with reference to FIG. 7.

Figure 7:
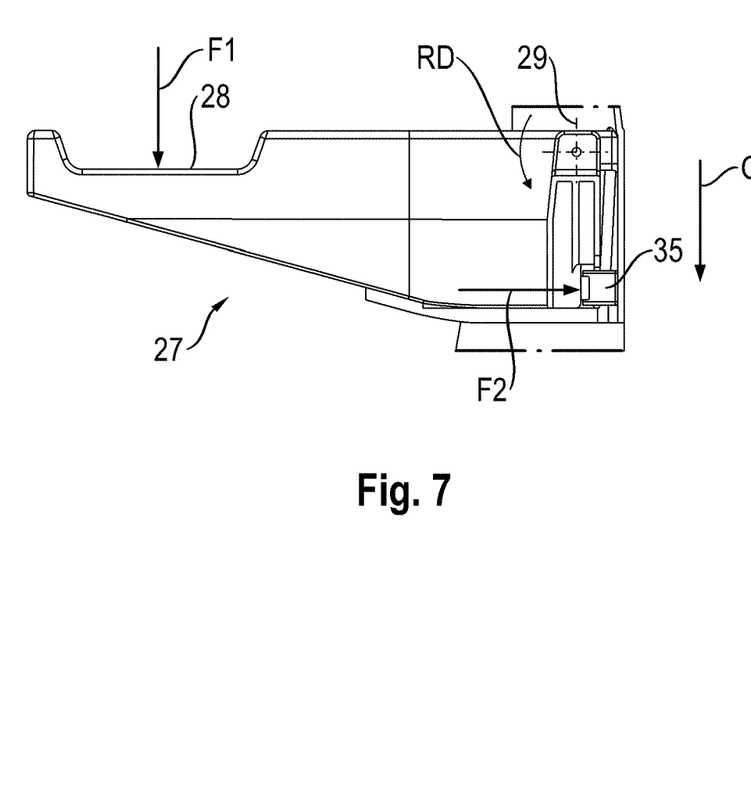
FIG. 7 is a detail side view of a holder part of a frame of a waste bin in accordance with the present disclosure.

FIG. 7 depicts a detail side view of a holder part 27 of a frame 11 of a waste bin 10 in accordance with the present disclosure. FIG. 7 further depicts parts of the frame 11 of a waste bin 10. The holder of FIG. 7 may be the holder of FIG. 6. The holder part 27 of FIG. 7 comprises attachment portions 28 configured to accommodate (and/or to be joined with) the attachment means 37 of the upper compartment 12. When attached to the holder part 27, the upper compartment 12 may (e.g., due to gravity) apply a force F1 to the holder part which, in the depicted case, runs in a vertical direction. Pivot axis 29 of the frame 11 is arranged such that a gravity force of the upper compartment 12 acting on the holder part 27 is at least partially converted into a horizontally oriented force F2.

The waste bin 10 further comprises a sensor 35 configured to measure at least a part of the force F2 in the horizontal direction. In FIG. 7, reference sign RD indicates a pivoting direction of the holder part 27 with respect to other components of the frame 11. A first distance between pivot axis 29 and the point(s) where force F1 is to be applied (i.e., the distance between pivot axis 29 and attachment portions 28, in particular, a center portion of the attachment portions 28) is greater than a second distance between pivot axis 29 and sensor 35. Preferably, the first distance is at least two times greater than the second distance. The previously defined proportions may be considered to promote slender design of the waste bin 10. Further, these proportions may allow utilizing a less sensitive sensor 35 (when compared to, e.g., a case in which the first distance and the second distance are equal). A reason may be that, due to a lever effect, force F2 may be higher than force F1. It is to be noted that, in some cases, highly sensitive sensors are more expensive than less sensitive sensors. The above-described features may, hence, promote cost-efficiency.

Figure 8:
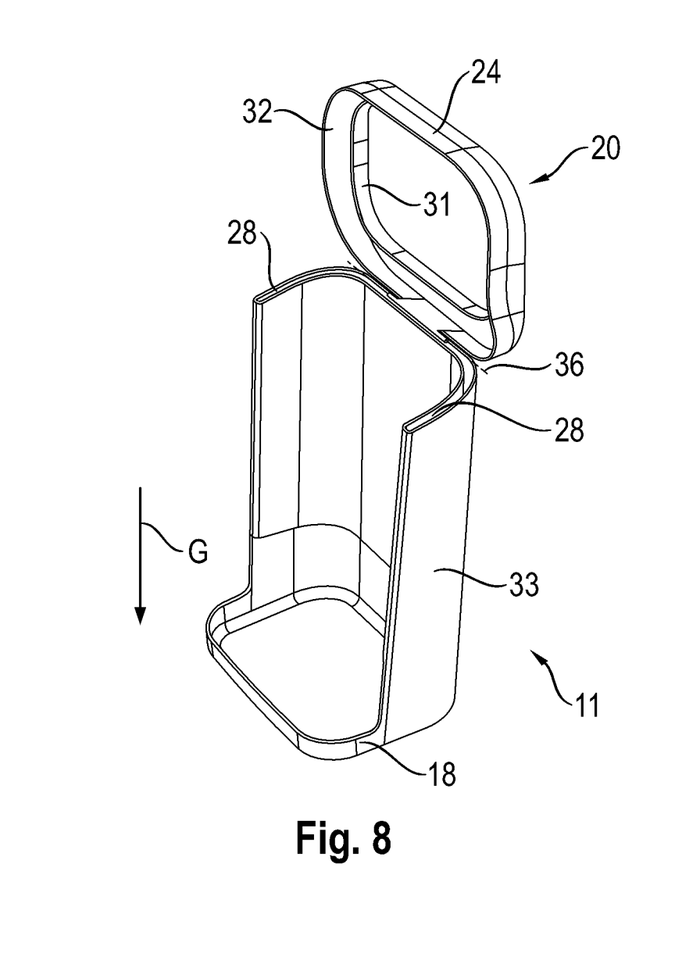
FIG. 8 depicts a variant of a frame which may be utilized in a waste bin in accordance with the present disclosure.

Another embodiment of of a frame 11 which may be utilized in a waste bin 10 is depicted in FIG. 8. The frame 11 of FIG. 8 may, e.g., replace the frame 11 of the waste bin 10 depicted in FIGS. 1, 2, and 3. The frame 11 of FIG. 8 comprises a pedestal 18 configured to accommodate a lower compartment 14, such as the lower compartment 14 depicted in FIG. 5. The frame 11 of FIG. 8 further comprises a U-shaped wall 33, and a cover lid 24. The cover lid 24 is attached to the U-shaped wall 33 so as to be rotatable about a lid axis 36. The cover lid 24 is configured to adopt a use-position and a release-position. In FIG. 8, a release-position of the cover lid 24 is depicted. A use-position may substantially correspond to the use-position of FIGS. 1, 2 and 3.

An upper portion of the U-shaped wall 33 is provided with attachment portions 28 configured to accommodate (and or to be joined with) attachment means 37 of an upper compartment 12 (e.g. be the upper compartment of FIG. 4). Since the U-shaped wall 33 is provided with the attachment portions 28, no holder part 27 has to be provided.

The cover lid 24 has a lid opening 20. The cover lid 24 further comprises an outer lid collar 32 and an inner lid collar 31 configured to hide a collar 26 of an upper compartment 12 to be attached to the frame 11 depicted, e.g., in FIG. 8 (when the cover lid is in the use-position).

The pedestal 18 of the frame 11 depicted in FIG. 8 is formed as a closed collecting tray (i.e., the pedestal has a liquid proof bottom wall and liquid proof side walls). This configuration may be advantageous as it allows preventing liquids dripping from the upper compartment 12 from getting in contact with the floor, even while the lower compartment 14 is in a released state (e.g., while being emptied).

Figure 9:
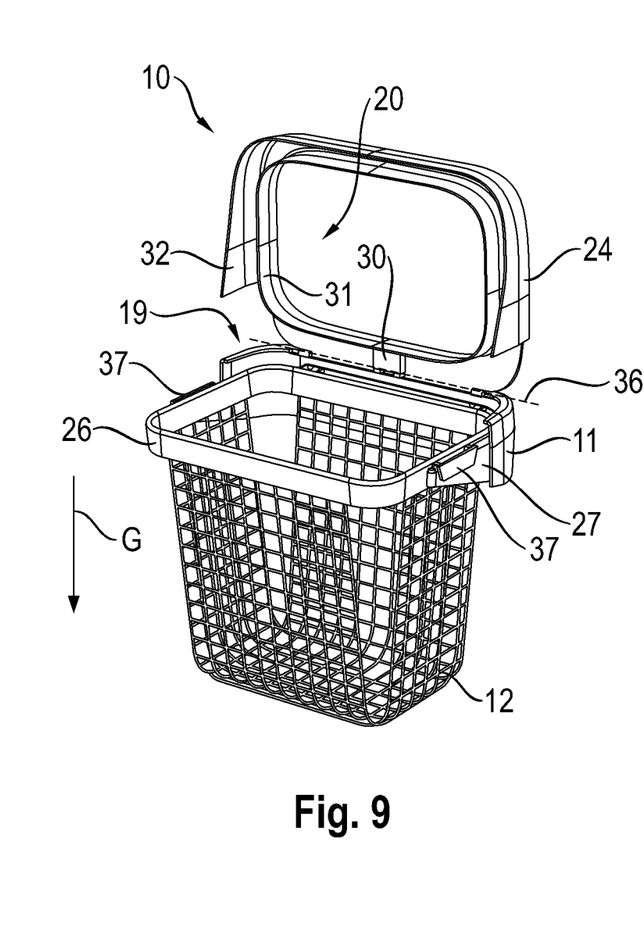
FIG. 9 depicts another waste bin in accordance with the present disclosure.

Another waste bin 10 in accordance with the present disclosure is depicted in FIG. 9. The waste bin 10 is a waste bin 10 for waste paper products, and comprises: a frame 11 having a wall mounting interface configured for attaching the waste bin 10 to a wall, in particular, a wall of a public washroom; a compartment 12 configured to receive waste paper products and/or other types of waste; a holder part 27 pivotably attached to the frame 11, so as to be pivotable relative to the frame 11 about a pivot axis 29, and configured to support the compartment 12 at two contact portions 28 thereof. The pivot axis 29 is arranged such that a gravity force of the compartment 12 (which is oriented in gravity direction G) acting on the holder part 27 is at least partially converted into a force having a component in a horizontal direction. The waste bin 10 further comprises a sensor 35 configured to measure at least a part of the component of the force in the horizontal direction.

The waste bin 10 further comprises a cover lid 24 which is provided pivotable about a lid axis 36 so as to adopt a use-position and the release-position. FIG. 9 depicts the release-position. The cover lid 24 further comprises an outer lid collar 32 and an inner lid collar 31 configured to hide a collar 26 of the compartment 12, attachment means 37 of the compartment 12, and/or the holder part 27 of the frame 11, when in the use-position. Optionally, the cover lid 24 (and/or the waste bin 10) may be provided with a level sensor 30 configured to measure a fill level of the compartment 12. The holder part 27 may substantially correspond to the holder part of FIG. 7. The compartment 12 may substantially correspond to the upper compartment 12 of FIGS. 1, 2, 3 and 4. Alternatively, or additionally, the compartment 12 of the waste bin 10 of FIG. 9 may be configured such that not only a lower portion of a front side thereof tapers, but so that a front side thereof tapers. Alternatively, or additionally, the compartment 12 may be configured such that a first lateral side and/or a second lateral side tapers. In the present context, tapering may relate to a case in which a cross-sectional area of the compartment 12 in a plane perpendicular to a gravity direction decreases from an upper end portion towards a lower end portion of the compartment 12.

The waste bin 10 of FIG. 9, further comprises a wall mounting interface configured for attaching the waste bin 10 to a wall, in particular, a wall of a public washroom. The waste bin 10 of FIG. 9 comprises exactly one compartment, and no pedestal. However, according to a variant, the waste bin 10 may further comprise a pedestal and/or one or more than one other compartments, such as a lower compartment 14 as depicted in FIG. 5.

While various example embodiments of devices in accordance with the present disclosure have been described above, it should be understood that they have been presented by way of example, and not limitation. It will be apparent to persons skilled in the relevant art(s) that various changes in form and detail can be made therein. Thus, the present disclosure should not be limited by any of the above described example embodiments but should be defined only in accordance with the following claims and their equivalents.

Further, it is to be understood that certain features described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

The invention claimed is:

1. A waste bin for waste paper products and other types of waste, the waste bin comprising:
   a frame for supporting at least two, compartments;
   an upper compartment supported by the frame and configured to receive waste paper product; and
   a lower compartment supported by the frame and configured to receive other types of waste;
   wherein the upper compartment is arranged above the lower compartment in a vertical direction of the waste bin,
   wherein at least a portion of the upper compartment is air permeable and at least a front or side of the frame is open to expose the upper compartment to allow air to enter the upper compartment from the front or the side of the frame,
   wherein at least a portion of the upper compartment is liquid permeable such that liquid within the upper compartment may be gravity-fed to the lower compartment,
   wherein the lower compartment comprises a liquid-impermeable bottom section and liquid-impermeable side-wall sections such that the liquid from the upper compartment may be held by the lower compartment,
   wherein at least one of the upper and lower compartments is detachable from the frame, and
   wherein each of the upper compartment and the lower compartment is accessible for introducing waste material thereinto independently from the respective other compartment.

2. The waste bin of claim 1, further comprising a wall mounting interface configured for attaching the waste bin to a wall.

3. The waste bin of claim 1, further comprising a pedestal configured to enable floor standing operation of the waste bin.

4. The waste bin of claim 1, wherein at least a part of the upper compartment is made of an air-permeable and/or liquid-permeable material and/or has an air-permeable and/or liquid-permeable structure.

5. The waste bin of claim 1, wherein the upper compartment comprises a plurality of openings.

6. The waste bin of claim 5, wherein the upper compartment comprises a plurality of openings in all faces thereof except in a face of the upper compartment facing the frame.

7. The waste bin of claim 1, wherein the upper compartment is made of or comprises a mesh structure, said mesh structure being made of a plastic material or a metal.

8. The waste bin of claim 7, wherein the plastic material comprises or consists of a Polypropylene-, and/or a reinforced Polypropylene- and/or Polyethylene-compound, wherein the Polypropylene- and/or Polyethylene-compounds comprise recycled material.

9. The waste bin of claim 1, wherein the upper compartment comprises a deposit opening for depositing waste paper products into the upper compartment, the deposit opening being provided in an upper end portion of the upper compartment, wherein a vertical projection of an area of the deposit opening occupies at least 50%, 60%, 70%, 80% or 90% of a maximum cross-sectional area of the waste bin in a plane perpendicular to the vertical direction.

10. The waste bin of claim 1, wherein the deposit opening lies in a plane which is inclined with respect to the vertical direction at an angle between 80° to 90°.

11. The waste bin of claim 1, wherein the lower compartment comprises a deposit opening that lies in a plane which is inclined with respect to the vertical direction at an angle between 80° to 90°.

12. The waste bin of claim 1, wherein a lower portion of the upper compartment is tapered and/or rounded such that a cross-sectional area of the upper compartment in a plane perpendicular to the vertical direction decreases in the direction from the upper compartment towards the lower compartment.

13. The waste bin of claim 1, wherein the upper compartment and the lower compartment are spaced from each other along the vertical direction, wherein a lowermost portion of the upper compartment is provided at least 5 cm above an uppermost portion of the lower compartment in the vertical direction of the waste bin.

14. The waste bin of claim 1, wherein the upper compartment comprises a deposit opening provided in an upper end portion thereof, wherein the lower compartment comprises a deposit opening provided in an upper end portion thereof, wherein a vertical projection of an area of the deposit opening of the lower compartment extends at least partially beyond a vertical projection of a bottom portion of the upper compartment in one or more directions perpendicular to the vertical direction of the waste bin.

15. The waste bin of claim 1, wherein a lower portion of the lower compartment is tapered and/or rounded.

16. The waste bin of claim 1, wherein the lower compartment comprises a deposit opening provided in an upper end portion thereof, and at least partially extending in the vertical direction.

17. The waste bin of claim 1, wherein the lower compartment comprises a disposable insert, said disposable insert comprising an absorbent material.

18. The waste bin of claim 17, wherein the disposable insert is made of or comprises compressed fibers.

19. The waste bin of claim 1, further comprising a cover lid pivotably mounted to the frame in an upper end portion thereof and configured to adopt a plurality of positions including a use-position, said cover lid comprising a lid opening which is, in the use-position, provided so as to align with a deposit opening of the upper compartment such that an outer circumferential edge of the deposit opening of the upper compartment is covered by the cover lid.

20. The waste bin of claim 19, wherein, in the use-position, the upper compartment is fixed to the frame by the cover lid, and wherein the cover lid is further configured to adopt a release-position enabling the upper compartment to be detached from the waste bin.

21. A waste bin for waste paper products and/or other types of waste, comprising:
   a frame, the frame comprising a wall mounting interface configured for attaching the waste bin to a wall;
   a compartment configured to receive waste paper products and/or other types of waste;
   a holder part pivotably attached to the frame, so as to be pivotable relative to the frame around a pivot axis, and configured to support the compartment at at least two, contact portions thereof;
   wherein the pivot axis is arranged such that a gravity force of the compartment acting on the holder part is at least partially converted into a force having a component in a horizontal direction, the horizontal direction being a direction perpendicular to a gravity direction, and
   wherein the waste bin further comprises a sensor configured to measure at least a part of the component of the force in the horizontal direction.

22. The waste bin of claim 21, further comprising:
   the sensor is a weight sensor disposed above the frame and configured to measure a total weight of the compartment or a weight of waste introduced into the compartment; and
   a level sensor disposed above the frame and configured to measure a fill level of the compartment.

23. The waste bin of claim 22, wherein the level sensor comprises or is a time of flight sensor, utilizing infrared light, a radar sensor, a capacitive sensor, an ultrasonic sensor, a photoelectric barrier, and/or an array of photoelectric barriers.

24. A method of servicing the waste bin of claim 22, said waste bin further being configured to output a value W measured by the weight sensor and a value L measured by the level sensor, the method comprising:
   (a) comparing the value W to a predetermined weight value PW;
   (b) comparing the value L to a predetermined fill level value PL;
   (c) if $L \geq PL$ and $W < PW$, compressing the waste in the compartment;
   (d) if $L \geq PL$ and $W \geq PW$, emptying the compartment.

* * * * *